United States Patent [19]

Swett

[11] Patent Number: 5,402,487

[45] Date of Patent: Mar. 28, 1995

[54] TELEPHONE HOUSING MOUNTING PLATE

[76] Inventor: Richard D. Swett, 123 Leland St., Portland, Me. 04103

[21] Appl. No.: 137,561

[22] Filed: Oct. 18, 1993

[51] Int. Cl.$^6$ .............................................. H04M 1/00
[52] U.S. Cl. ........................................ 379/435; 379/436
[58] Field of Search ............... 379/435, 436, 446, 449, 379/451

[56] References Cited

U.S. PATENT DOCUMENTS 4,741,033  4/1988  Utoh et al. ........................... 379/435

FOREIGN PATENT DOCUMENTS 60-248054  5/1984  Japan .................................. 379/435

*Primary Examiner*—James L. Dwyer
*Assistant Examiner*—Jack Chiang
*Attorney, Agent, or Firm*—Frederick R. Cantor

[57] ABSTRACT

A telephone housing is mounted on a metal plate that is secured in a fixed location on a room wall. The mounting plate has two vertical flanges extending along its side edges; hooks project forwardly from the flanges, for interengagement with vertical slots formed in the housing rear wall. At its lower edge, the mounting plate has two forwardly extending tabs that form two additional hooks. Additional slots in the telephone housing rear wall receive the two additional hooks to provide additional support for the housing. The preferred mounting plate is formed out of sheet aluminum by a stamping and bending process.

3 Claims, 2 Drawing Sheets

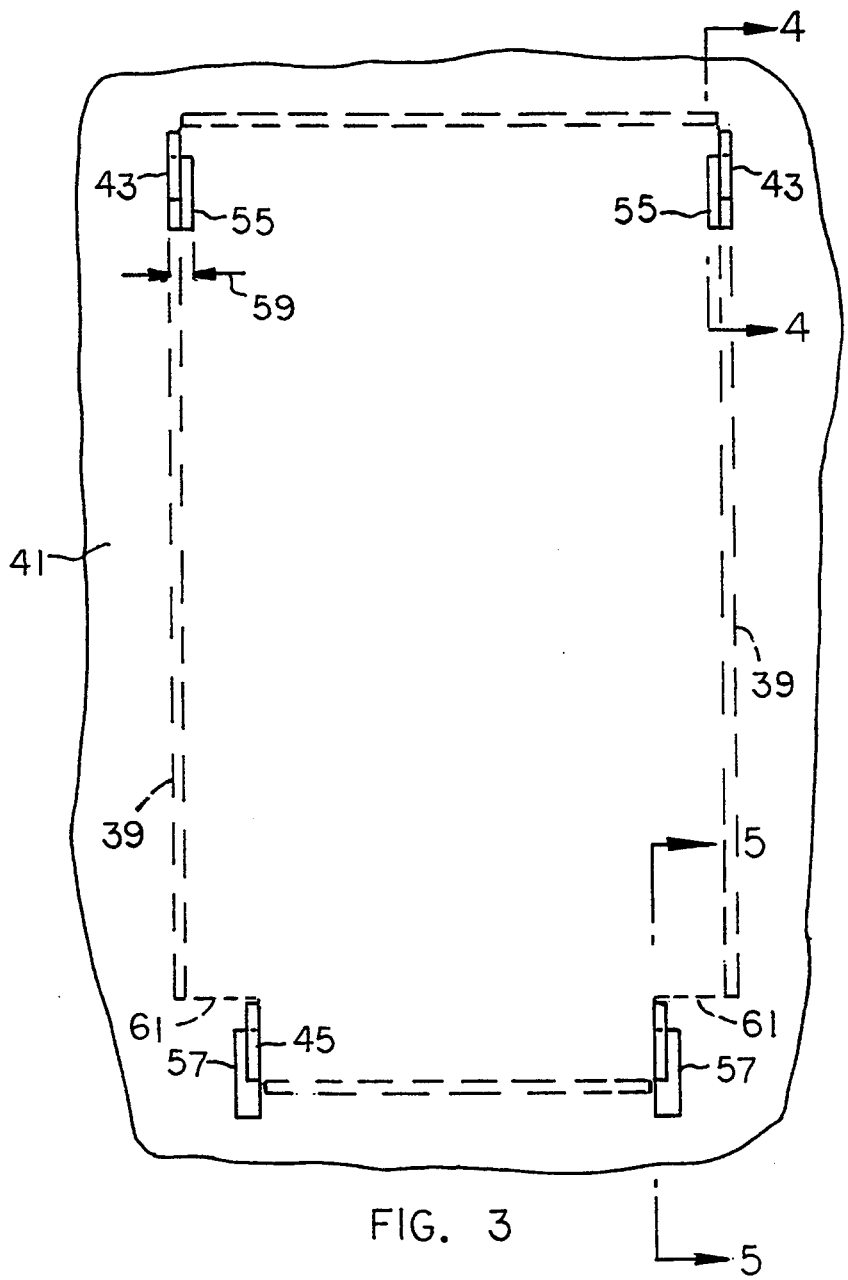
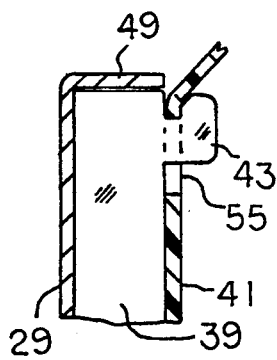
FIG. 4
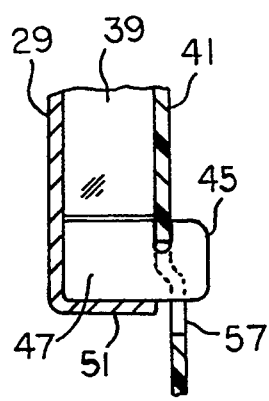
FIG. 5
FIG. 3

TELEPHONE HOUSING MOUNTING PLATE

BACKGROUND OF THE PRESENT INVENTION

The present invention relates to a mechanism for mounting a telephone housing.

The present invention, further relates, to a mechanism for releasably mounting a telephone housing on a vertical wall. The mounting mechanism is designed especially for use with IDS telephone models 82 100, 82 200, 82 300 and 82 500.

Various mounting systems have been devised for supporting telephone housings. One such mounting mechanism, comprises a hollow plastic box structure affixed to a vertical wall, and having upper and lower arms, adapted to extend through slots in the rear wall of a telephone housing. The upper arms are resilient elements, having hook-shaped ends that are adapted to exert a grip force on the slot edges, whereby the telephone housing is releasably attached to the plastic box structure.

U.S. Pat. No. 5,133,528, issued to A. Vogl et al., on Jul. 28, 1992, discloses a telephone support plate having upper and lower blades for holding a telephone housing. A security screw is extended from the housing underneath a projection on the support plate, to prevent the telephone housing from being lifted upwardly away from the support plate.

SUMMARY OF THE PRESENT INVENTION

An object of the present invention, is to provide a mechanism for mounting a telephone housing.

A further object of the present invention, is to provide a mechanism for releasably mounting a telephone housing on a vertical wall.

The present invention, comprises a mounting plate attachable to a vertical wall, and having two elongated vertical flanges extending forwardly for abutment against the rear wall of a telephone housing. Hooks formed integrally with the flanges, extend through slots in the telephone housing rear wall, whereby the weight of the telephone housing is borne by the mounting plate. Two additional hooks extend from the mounting plate near its lower edge, to provide an additional securement force for the telephone housing.

The mounting plate is preferably formed out of a rigid aluminum sheet having a thickness of about 0.08 inch. The vertical flanges and hooks are integral extensions of the aluminum sheet, so that the mounting plate structure can be formed economically by stamping and bending operations. The hooks can be precision-formed by the stamping dies.

In summary, and in accordance with the above discussion, the foregoing objectives are achieved in the following embodiments:

1. A mounting plate for a telephone housing, wherein the housing has a rear wall, two horizontally spaced upper slots in said rear wall, and two horizontally spaced lower slots in said rear wall, said mounting plate comprising a flat plate element having an upper edge, a lower edge, and two vertical side edges;

an elongated vertical flange extending forwardly from each side edge of said plate element for engagement against the rear wall of the telephone housing;

an upper hook integral with each flange for extension through one of the upper slots in the housing rear wall;

two vertical tabs extending forwardly from said plate element near its lower edge;

a lower hook integral with each tab for extension through one of the lower slots in the housing rear wall; and each hook having an upwardly facing notch, adapted to receive therein an edge area of the housing rear wall at the upper limit of an associated slot when the housing is moved downwardly on the vertical flanges.

2. The mounting plate, as described in paragraph 1, wherein the vertical spacing between the notches in the upper and lower hooks, is slightly greater than the corresponding spacing between the upper and lower slots in the housing rear wall, whereby the weight of the telephone housing is borne entirely by the upper hooks.

3. The mounting plate, as described in paragraph 1, wherein said plate element is formed of a bendable metal, such that said hook can be bent normal to the planes of the associated vertical flanges and vertical tabs, whereby said hooks can be adjusted to ensure passage thereof through the associated slots in the housing rear wall.

4. The mounting plate, as described in paragraph 3, wherein said plate element is formed of aluminum.

5. The mounting plate, as described in paragraph 1, wherein said plate element is formed of a bendable metal; each slot having two vertical side edges defining the slot length dimension, and two horizontal edges defining the slot width dimension; the plate element having a thickness dimension that is less than the width dimension of the slots, such that the hooks can be bent normal to the planes of the associated vertical flanges and vertical tabs, whereby said hooks can be adjusted to ensure passage thereof through the associated slots.

6. The mounting plate, as described in paragraph 5, wherein said plate element is formed of aluminum.

7. The mounting plate, as described in paragraph 5, wherein the upper hooks are bendable to seat tightly against selected side-edges of the associated upper slots, whereby the telephone housing is precluded from lateral play on the mounting plate.

8. The mounting plate, as described in paragraph 7, wherein the lower hooks are bendable to seat tightly against selected side edges of the associated lower slots.

9. The mounting plate, as described in paragraph 1, wherein each vertical flange has a forward straight edge adapted to abut the rear wall of the telephone housing; each notch having a rear surface coplanar with the forward edges of the vertical flanges, whereby the edges of said flanges have extensive full length engagement with the housing rear wall.

10. The mounting plate, as described in paragraph 1, wherein said upper hooks are coplanar with the associated vertical flanges.

11. The mounting plate, as described in paragraph 1, and further comprising, two vertically spaced keyhole openings in said plate element for supporting same in a stationary position, and a clearance opening in said plate element, for accessing a stationary electrical connector extending through said clearance opening.

12. The mounting plate, as described in paragraph 11, wherein the spacing between said tabs is less than the spacing between the flanges, whereby clearance spaces are formed alongside the tabs for accommodation of lead wiring connectable to said stationary electrical connector.

A BRIEF DESCRIPTION OF THE DRAWINGS

FIG. 3, is an enlarged sectional view, taken along line 3—3, in FIG. 1.

FIG. 4, is a fragmentary sectional view, taken along line 4—4, in FIG. 3.

FIG. 5, is a fragmentary sectional view, taken along line 5—5, in FIG. 3.

DESCRIPTION OF THE PREFERRED EMBODIMENT OF THE PRESENT INVENTION

Figure 1:
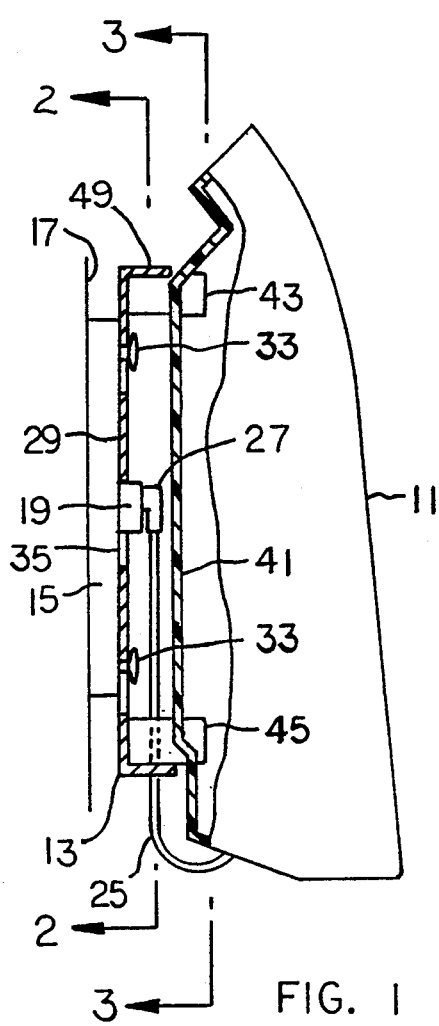
FIG. 1, is a side elevational view, of a telephone housing mounted on a support plate, constructed according to the present invention. Parts are shown in section, to illustrate particular features.

FIG. 1, is a side elevational view, of a telephone housing mounted on a support plate, constructed according to the present invention. Parts are shown in section, to illustrate particular features.

Figure 2:
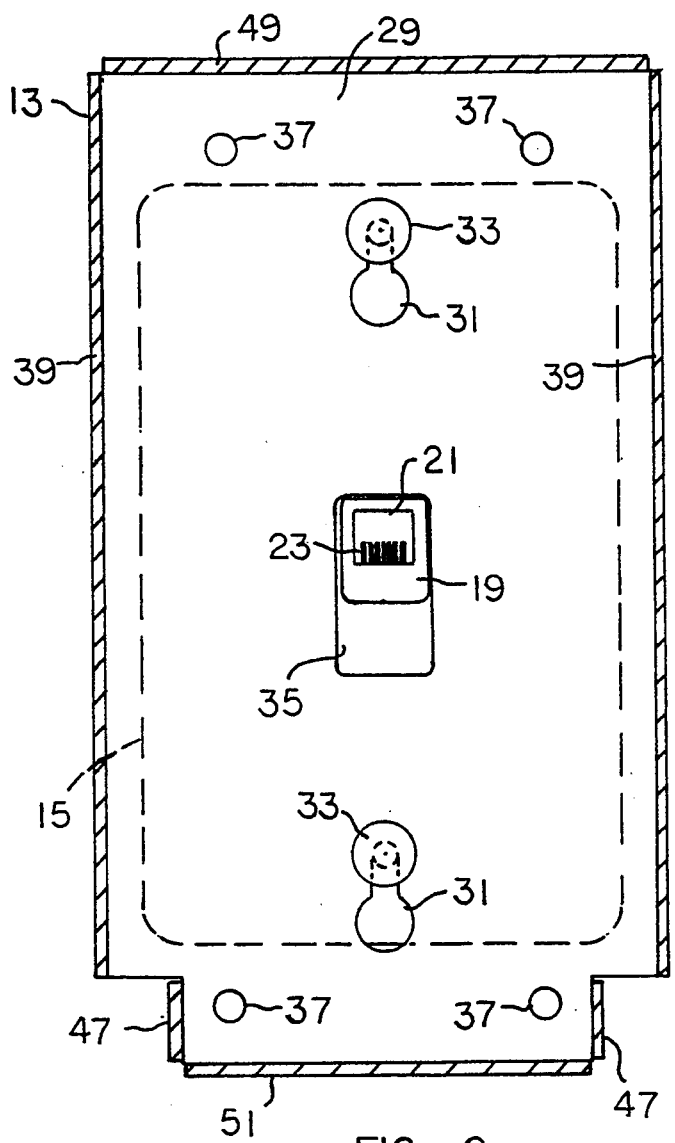
FIG. 2, is an enlarged sectional view, taken along line 2—2, in FIG. 1.

FIG. 2, is an enlarged sectional view, taken along line 2—2, in FIG. 1.

FIG. 1, shows in side elevation, a telephone housing 11, supported on a mounting plate 13, constructed according to the present invention. Plate 13, is releasably attached to a plastic panel 15, that is affixed to a vertical wall surface 17. Panel 15, is a conventional structure, used for mounting a wall telephone.

Figure 6:
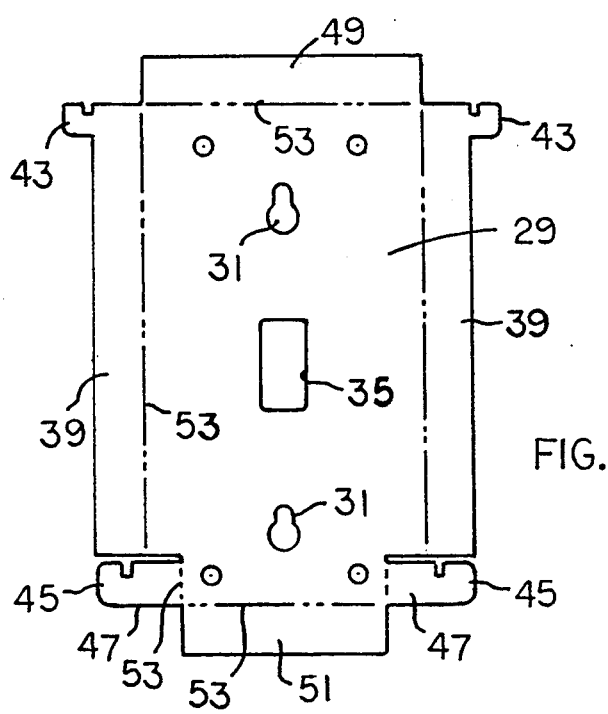
FIG. 6, is a plan view, of a sheet metal blank used to form a mounting plate in FIG. 1 assembly.

The present invention is concerned more particularily with telephone housing mounting plate 13. Mounting plate 13, is formed out of a single sheet of bendable metal, having the configuration, prior to bending, as depicted in FIG. 6.

Plastic panel 15, comprises a rectangular boss 19, extending forwardly from the panel 15 front surface, said boss 19, having a cavity 21, (FIG. 2), that contains an array of electrical contacts 23. Telephone housing 11, has flexible lead wiring 25, that terminates in an electrical jack 27. The jack 27, is adapted to plug into cavity 21, to make electrical connections with electrical contacts 23. Lead wiring 25, has sufficient length that jack 27, can be plugged into cavity 21, with the telephone housing 11, detached from mounting plate 13.

Mounting plate 13, comprises a flat plate element 29, having two keyhole openings 31, adapted to fit onto headed pins 33, carried by stationary panel 15. A rectangular clearance hole 35, is provided in plate element 29, to accomodate boss 19, such that electrical contacts, i.e., connections 23, are made accessible to the electrical jack 27. Plate element 29, also has four small circular holes 37, adapted to receive screws (not shown), should it be desired to permanently affix plate 13, to the room wall 17.

Mounting plate 13, comprises two vertical flanges 39, extending forwardly from the side edges of central plate element 29, so as to form abutment surfaces for rear wall 41 of telephone housing 11. Upper hooks 43, are formed integrally with flanges 39. Two lower hooks 45, are formed integrally with tabs 47, that extend forwardly from plate element 29. Flanges 49 and 51, extend forwardly from the upper and lower edges of central plate element 29.

FIG. 6, is a plan view, of a sheet metal blank used to form a mounting plate in the FIG. 1 assembly.

FIG. 6, shows the mounting plate 13, in the flat state, prior to formation of tabs 47 and flanges 39, 49 and 51. The tabs and flanges are formed by bending the metal plate along bend lines indicated generally by numerals 53. The mounting plate is formed of a bendable metal, preferably sheet aluminum having a thickness of about 0.08 inch. The final plate structure is rigid, so as to form a fixed stationary mounting structure for the telephone housing 11.

FIG. 3, is an enlarged sectional view, taken along line 3—3, in FIG. 1.

FIG. 4, is a fragmentary sectional view, taken along line 4—4, in FIG. 3.

FIG. 5, is a fragmentary sectional view, taken along line 5—5, in FIG. 3.

As shown best in FIG. 3, rear wall 41, of the telephone housing has two horizontally spaced upper slots 55, and two horizontally spaced lower slots 57. The various slots are spaced so that when the telephone housing is moved against the front edges of vertical flanges 39, the hooks 43 and 45, will project through slots 55 and 57. By moving the telephone housing downward, it is possible to cause edge areas of the housing rear wall 41, at the upper limits of slots 55 and 57, to seat in the upwardly facing notches formed in hooks 43 and 45. FIGS. 4 and 5, show the condition of the housing rear wall 41, when the wall is seated in the notches.

Hooks 43 and 45, are vertically spaced so that the upper hooks 43, carry the weight of the telephone housing. Lower hooks 45, prevent separation of the housing from mounting plate 13, but do not carry vertical loads. In this connection, it will be seen from FIG. 5, that the bottom surface of the notch in hook 45 is spaced slightly below the slot edge on wall 41. As shown in FIG. 4, the bottom is engaged with the associated slot edge on wall 41. The notch width is such that each notch exerts a functional grip on wall 41.

It will be seen from FIG. 3, that the width dimension 59, of each slot 55 or 57, is greater than the corresponding width dimension of the associated hook 43 or 45, i.e., the thickness of the metal plate. The slots and hooks are oriented so that selected side surfaces of the hooks seat against side edges of the associated slots 55 or 57. As shown, hooks 43, have their outer side surfaces seated against the outer side edges of slots 55, whereas hooks 45, have their inner side surfaces seated against the inner side edges of slots 57. The side edge engagements of the hooks and slots, prevents 'side play' of the telephone housing on mounting plate 13.

Hooks 43 and 45, are capable of being bent in directions transverse to the hook planes, for purposes of aligning the hooks with slots 55 and 57. Such transverse bending of the hooks, can be used to ensure engagement of the hook side surfaces with the slot side edges, in order to prevent side play of housing 11. Plate 13 is preferably formed of sheet aluminum, so that the hooks 43 and 45, can be readily bent to achieve a desired orientation of the hooks relative to slots 55 and 57. The mounting plate is preferably formed by a stamping operation, which results in a relatively precise hook configuration and hook spacing. In many cases it would not be necessary to bend the hooks to achieve the hook-slot relation depicted in FIG. 3.

The horizontal spacing between tabs 47 is less than the horizontal spacing between flanges 39. As a result, clearance spaces are formed alongside the tabs. In FIG. 3, such clearance spaces are referenced by numeral 61. Such clearance spaces, can be used to permit passage of lead wiring 25, from housing 11, into the space behind housing rear wall 41. The electrical jack 27, can be plugged into the electrical connector boss 19, while housing 11, is disconnected from mounting plate 13.

It will be noted that hooks 43, are integral extensions of vertical flanges 39. This is advantageous in that the notch surfaces in hooks 43, are precisely aligned with the front edges of flanges 39, whereby the telephone housing can be easily installed on mounting plate 13 without concern as to manufacturing tolerances.

The present invention describes a telephone housing mounting plate. Features of the present invention are recited in the appended claims. The drawings herein necessarily depict specific structural features and embodiments of the telephone housing mounting plate, useful in the practice of the present invention.

However, it will be appreciated by those skilled in the arts pertaining thereto, that the present invention can be practiced in various alternate forms and configurations. Further, the previously detailed descriptions of the preferred embodiments of the present invention, are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed is:

1. A one piece mounting plate for a telephone housing, wherein the housing has a rear wall, two horizontally spaced upper slots in said rear wall, and two horizontally spaced lower slots in said rear wall:

said one piece mounting plate comprising a flat plate element having an upper edge, a lower edge, and two vertical side edges;

an elongated vertical flange extending forwardly from each side edge of said plate element from the plate element upper edge to a point near the plate lower edge, for engagement against the rear wall of the telephone housing;

an upper hook integral with each flange for extension through one of the upper slots in the housing rear wall;

two vertical tabs extending forwardly from said plate element near its lower edge;

said vertical flanges and said vertical tabs being located in parallel vertical planes;

the horizontal spacing between said tabs being less than the horizontal spacing between said flanges, whereby clearance spaces (61) are formed alongside the tabs for accommodation of lead wiring associated with the telephone housing;

a lower hook integral with each tab for extension through one of the lower slots in the housing rear wall;

each upper hook being coplanar with the associated vertical flange;

each lower hook being coplanar with the associated vertical tab; and each hook having an upwardly facing notch adapted to receive therein an edge area of the housing rear wall at the upper limit of an associated slot when the telephone housing is moved downwardly on the elongated vertical flanges.

2. The mounting plate as described in claim 1, wherein said plate element is formed of a bendable metal, such that each said hook is bent transverse to the hook plane to ensure passage thereof through the associated slots in the telephone housing rear wall.

3. The mounting plate as described in claim 1, wherein each hook has a transverse thickness dimension less than the corresponding dimension (59) of the associated slot in the telephone housing rear wall, whereby each hook is bent to seat tightly against a selected side edge of the associated slot, to preclude lateral side play between the telephone housing and the mounting plate.

* * * * *